United States Patent
Yoshizawa et al.

(10) Patent No.: US 11,277,528 B2
(45) Date of Patent: Mar. 15, 2022

(54) MOBILE TYPE APPARATUS AND IMAGING SYSTEM

(71) Applicant: FUJIFILM CORPORATION, Tokyo (JP)

(72) Inventors: Hirotoshi Yoshizawa, Kanagawa (JP); Shinichiro Sonoda, Kanagawa (JP)

(73) Assignee: FUJIFILM CORPORATION, Tokyo (JP)

(*) Notice: Subject to any disclaimer, the term of this patent is extended or adjusted under 35 U.S.C. 154(b) by 0 days.

(21) Appl. No.: 17/086,460

(22) Filed: Nov. 2, 2020

(65) Prior Publication Data

US 2021/0051237 A1 Feb. 18, 2021

Related U.S. Application Data

(63) Continuation of application No. PCT/JP2019/017050, filed on Apr. 22, 2019.

(30) Foreign Application Priority Data

May 14, 2018 (JP) .............................. JP2018-093045

(51) Int. Cl.
*H04N 1/00* (2006.01)
*G03B 15/00* (2021.01)
(Continued)

(52) U.S. Cl.
CPC ......... *H04N 1/00251* (2013.01); *G03B 15/00* (2013.01); *H04N 1/00254* (2013.01);
(Continued)

(58) Field of Classification Search
CPC ........... H04N 1/00251; H04N 1/00254; H04N 1/00779; H04N 5/2257; H04N 5/23203;
(Continued)

(56) References Cited

U.S. PATENT DOCUMENTS

| 9,460,369 B2 * | 10/2016 | Moore .............. H04N 1/00562 |
| 2002/0042267 A1 * | 4/2002 | Kim ..................... G06F 3/1261 |
| | | 455/418 |

(Continued)

FOREIGN PATENT DOCUMENTS

| CN | 107533627 A | 1/2018 |
| JP | 2001-111935 A | 4/2001 |

(Continued)

OTHER PUBLICATIONS

International Search Report issued in International Application No. PCT/JP2019/017050 dated Jun. 11, 2019.
(Continued)

*Primary Examiner* — Albert H Cutler
(74) *Attorney, Agent, or Firm* — Solaris Intellectual Property Group, PLLC

(57) ABSTRACT

A mobile type apparatus, that derives, from a distance to a delivery target and a time period required from a start of forming of an image until completion of discharge, a movement speed at which a recording medium becomes a deliverable state at a position at which the recording medium is deliverable to the delivery target, wherein at least a partial period overlaps between a period from a start of forming of the image on the recording medium until completion of discharge of the recording medium, and a period from a start of movement until completion of the movement, and wherein the movement is controlled in accordance with the derived movement speed.

12 Claims, 10 Drawing Sheets

(51) Int. Cl.
*H04N 5/225* (2006.01)
*H04N 5/232* (2006.01)
*G06K 9/00* (2006.01)
*G03B 17/38* (2021.01)
*G03B 17/50* (2021.01)
*H04N 5/222* (2006.01)

(52) U.S. Cl.
CPC ....... *H04N 1/00779* (2013.01); *H04N 5/2257* (2013.01); *H04N 5/23203* (2013.01); *H04N 5/23218* (2018.08); *G06K 9/00355* (2013.01); *H04N 2201/0084* (2013.01); *H04N 2201/0096* (2013.01)

(58) Field of Classification Search
CPC ....... H04N 5/23218; H04N 2201/0084; H04N 2201/0096; H04N 5/222; H04N 5/232; G03B 15/00; G03B 17/38; G03B 17/50; G06K 9/00355
See application file for complete search history.

(56) References Cited

U.S. PATENT DOCUMENTS

| | | | |
|---|---|---|---|
| 2005/0041839 A1 | 2/2005 | Saitou et al. | |
| 2018/0089511 A1 | 3/2018 | Tsuchimochi | |
| 2019/0011921 A1* | 1/2019 | Wang | H04N 5/23299 |
| 2019/0253611 A1* | 8/2019 | Wang | G06F 3/04845 |
| 2021/0092305 A1* | 3/2021 | Miyake | G03B 15/00 |

FOREIGN PATENT DOCUMENTS

| | | | |
|---|---|---|---|
| JP | 2001-125646 A | | 5/2001 |
| JP | 2003-331266 A | | 11/2003 |
| JP | 2005-10244 A | | 1/2005 |
| JP | 2005-65022 A | | 3/2005 |
| JP | 2005-065024 A | | 3/2005 |
| JP | 2005-136760 A | | 5/2005 |
| JP | 2012-15660 A | | 1/2012 |
| JP | 2017-54537 A | | 3/2017 |
| JP | 2017054537 | * | 3/2017 |
| KR | 1020050047331 | * | 12/2006 |

OTHER PUBLICATIONS

Written Opinion of the ISA issued in International Application No. PCT/JP2019/017050 dated Jun. 11, 2019.
International Preliminary Report on Patentability issued in International Application No. PCT/JP2019/017050 dated Nov. 26, 2019.
English language translation of the following: Office action dated Aug. 19, 2021 from the SIPO in a Chinese patent application No. 201980031959.2 corresponding to the instant patent application. This office action translation is submitted now in order to supplement the understanding of the cited references which are being disclosed in the instant Information Disclosure Statement.

* cited by examiner

MOBILE TYPE APPARATUS AND IMAGING SYSTEM

CROSS-REFERENCE TO RELATED APPLICATIONS

This application is a continuation of International Application No. PCT/JP2019/017050, filed on Apr. 22, 2019, which claims priority to Japanese Patent Application No. 2018-093045, filed on May 14, 2018. The entire disclosures of both of the above-referenced applications are hereby incorporated by reference into the present application.

BACKGROUND

Technical Field

The present disclosure relates to a mobile type apparatus and an imaging system.

Related Art

An image forming apparatus that is self-propelled to a vicinity of a user in a case where an instruction to start forming an image is input from the user has been suggested (refer to JP2017-054537A). This image forming apparatus is self-propelled to the vicinity of the user and then, starts forming the image in a case where a predetermined operation is performed by the user.

A mobile type apparatus that comprises an imaging apparatus and images a moving imaging target by following the imaging target has been suggested (refer to JP2005-065022A).

In the technology disclosed in JP2017-054537A, a problem arises in that a relatively long time period is taken from an input of the instruction to start forming the image by the user until a recording medium on which the image is formed is obtained. This problem is also not considered in the technology disclosed in JP2005-065022A.

SUMMARY

An aspect of the present disclosure is a mobile type apparatus that includes: a memory; and a processor being connected to the memory and being configured to: acquire an image obtained by imaging performed by an imaging apparatus; perform a control for arranging a preset imaging target within an angle of view of the imaging apparatus; perform a control for forming the image on a recording medium in a case where the imaging target is present in the acquired image; discharge the recording medium on which the image is formed, to a preset delivery target in a deliverable state; control movement of the mobile type apparatus for delivering the recording medium to the delivery target; and derive, from a distance to the delivery target and a time period required from a start of forming of the image until completion of discharge, a movement speed at which the recording medium becomes the deliverable state at a position at which the recording medium is deliverable to the delivery target, wherein at least a partial period overlaps between a period from a start of forming of the image on the recording medium until completion of discharge of the recording medium, and a period from a start of movement until completion of the movement, and wherein the movement is controlled in accordance with the derived movement speed.

DETAILED DESCRIPTION

Hereinafter, embodiments of the technology of the present disclosure will be described in detail with reference to the drawings.

First Embodiment

Figure 1:
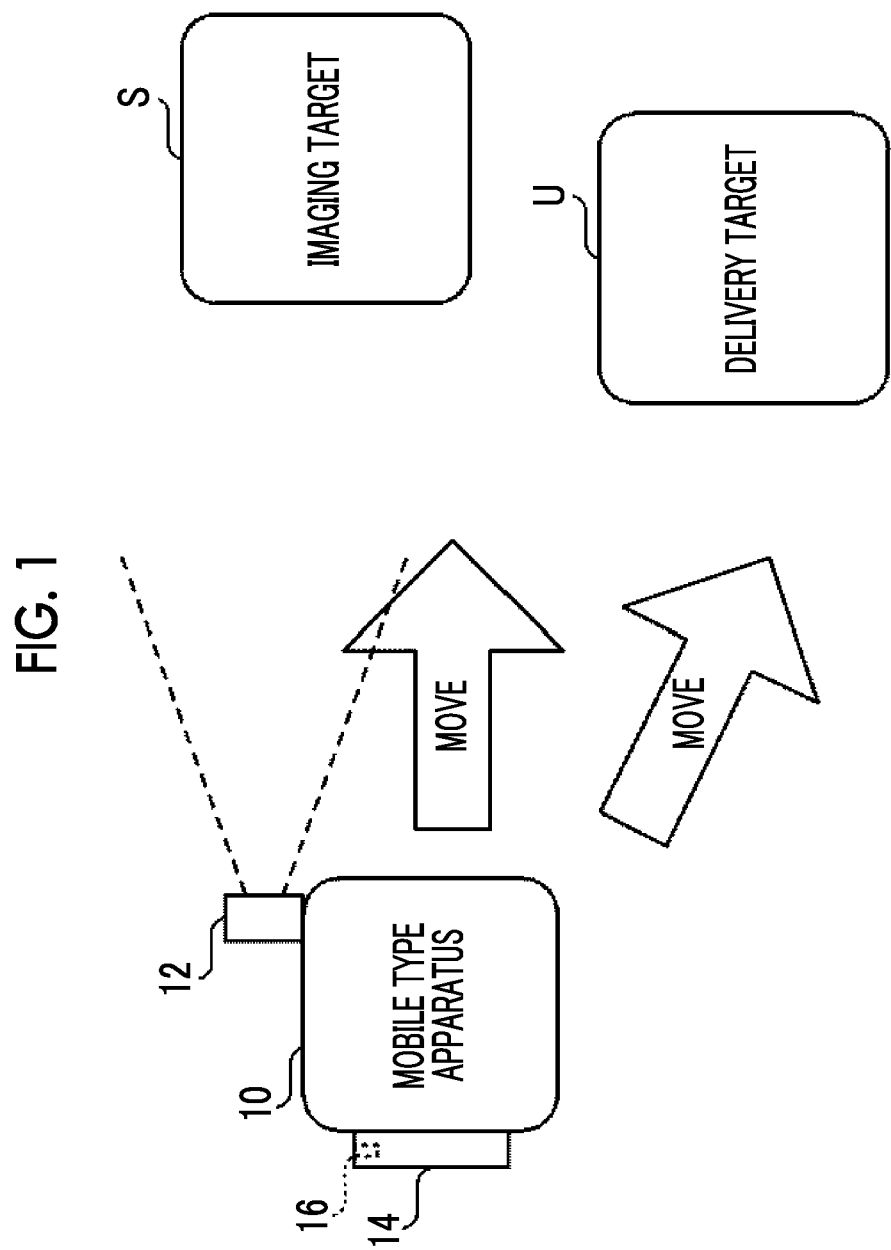
FIG. 1 is a block diagram illustrating one example of a configuration of a mobile type apparatus according to a first embodiment.

First, a configuration of a mobile type apparatus 10 according to the present embodiment will be described with reference to FIG. 1. As illustrated in FIG. 1, the mobile type apparatus 10 comprises an imaging apparatus 12 and an image forming apparatus 14. The mobile type apparatus 10 and the imaging apparatus 12 are communicably connected by at least one of wired communication or wireless communication. The mobile type apparatus 10 and the image forming apparatus 14 are communicably connected by at least one of wired communication or wireless communication.

The imaging apparatus 12 includes an imaging element such as a charge coupled device (CCD) image sensor or a complementary metal oxide semiconductor (CMOS) image sensor, and an imaging lens, and outputs an image obtained by imaging to the mobile type apparatus 10. The imaging apparatus 12 is mounted on a movement mechanism 26 (refer to FIG. 2). A height and an attitude of the imaging apparatus 12 can be controlled by controlling the movement mechanism 26 using the mobile type apparatus 10.

The image forming apparatus 14 comprises a plurality of light emitting elements and forms an image on a photosensitive recording medium such as a photosensitive film by causing the light emitting elements to emit light. The image forming apparatus 14 may be an apparatus that forms the image on the recording medium using other methods such as an ink jet method, a xerographic method, a thermal method, and a thermal transfer method. The image forming apparatus 14 comprises a discharge unit 16 that discharges the photosensitive recording medium on which the image is formed, to a preset delivery target U in a deliverable state. For example, the deliverable state is a state where the discharge unit 16 discharges one end side of the photosensitive recording medium to an outside of the image forming apparatus 14 and holds the other end side thereof.

The mobile type apparatus 10 comprises a plurality of wheels and can move in directions in 360 degrees by controlling rotation and directions of the wheels. The mobile type apparatus 10 may be a moving object that moves by bipedal walking, quadrupedal walking, or the like, may be a flying object that moves in a floating state by a magnetic force, or may be a flying object that moves by flying using a propeller or the like.

The mobile type apparatus 10 according to the present embodiment images a preset imaging target S using the imaging apparatus 12 and forms an image obtained by imaging on the photosensitive recording medium using the image forming apparatus 14. The mobile type apparatus 10 according to the present embodiment moves in order to deliver the photosensitive recording medium on which the image is formed, to the delivery target U.

Examples of the imaging target S include a target represented by a common noun such as a child, a person, a baby, an animal, a dog, and a building, and a target represented by a proper noun such as a specific person, a specific pet, and a specific building. Examples of the delivery target U include a target represented by a proper noun such as a specific person. The imaging target S and the delivery target U may be the same person.

Figure 2:
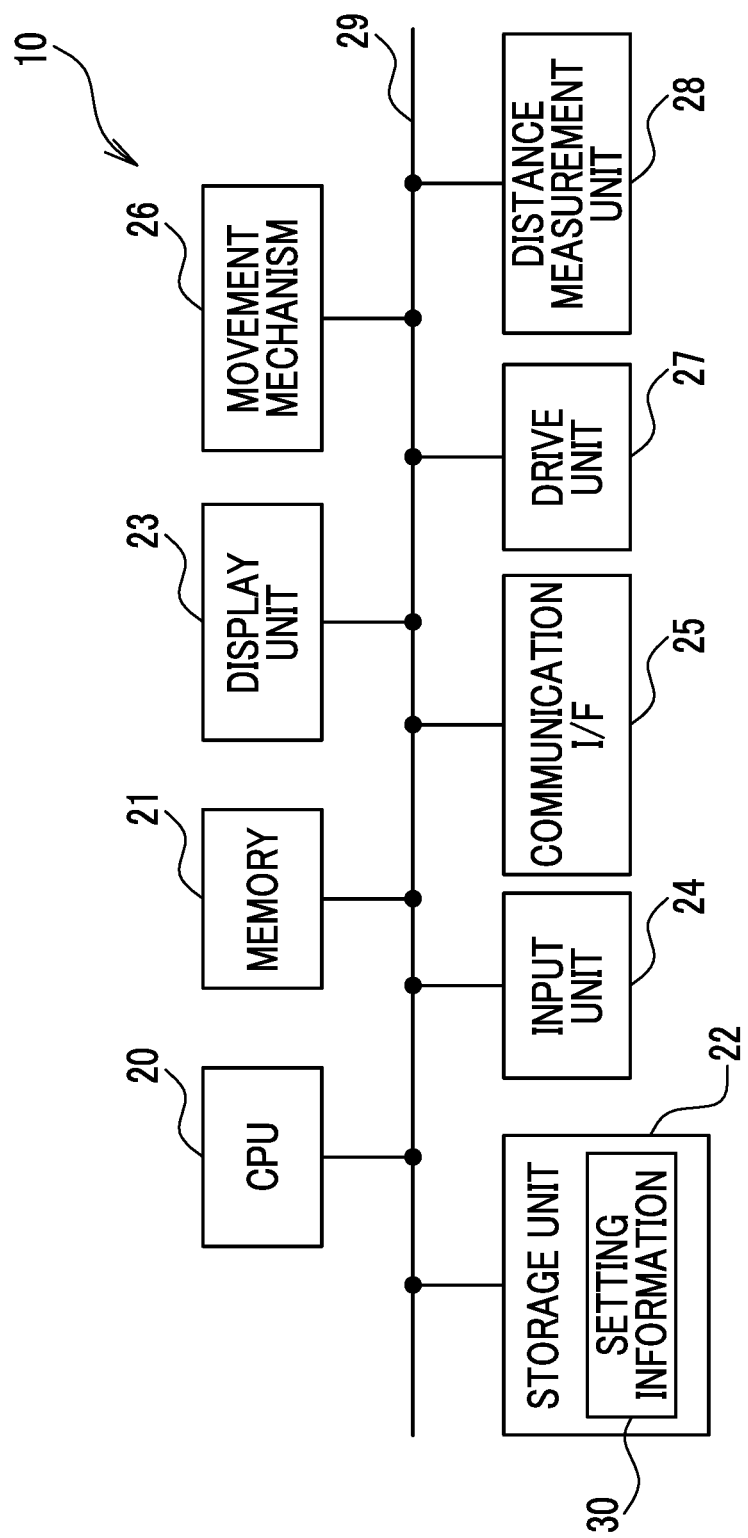
FIG. 2 is a block diagram illustrating one example of a hardware configuration of mobile type apparatuses according to first and second embodiments.

Next, a hardware configuration of the mobile type apparatus 10 will be described with reference to FIG. 2. As illustrated in FIG. 2, the mobile type apparatus 10 comprises a central processing unit (CPU) 20, a memory 21 as a temporary storage region, and a non-volatile storage unit 22. In addition, the mobile type apparatus 10 comprises a display unit 23 such as a liquid crystal display and an input unit 24 such as a touch panel integrated with various buttons and the display unit 23. In addition, the mobile type apparatus 10 comprises a communication interface (I/F) 25 that is used for communication among the imaging apparatus 12, the image forming apparatus 14, and an external apparatus, the movement mechanism 26, a drive unit 27, and a distance measurement unit 28. The CPU 20, the memory 21, the storage unit 22, the display unit 23, the input unit 24, the communication I/F 25, the movement mechanism 26, the drive unit 27, and the distance measurement unit 28 are connected through a bus 29.

The storage unit 22 is implemented by a hard disk drive (HDD), a solid state drive (SSD), a flash memory, and the like. The storage unit 22 stores setting information 30 described later.

The movement mechanism 26 changes the height and the attitude of the imaging apparatus 12 by moving the imaging apparatus 12 under control of the CPU 20. The drive unit 27 includes a motor or the like and moves the mobile type apparatus 10 by transmitting a drive force from the motor to the wheels under control of the CPU 20. The distance measurement unit 28 measures a distance between the mobile type apparatus 10 and the delivery target U. Examples of the distance measurement unit 28 include a twin lens camera, an infrared sensor, and an ultrasonic sensor.

Figure 3:
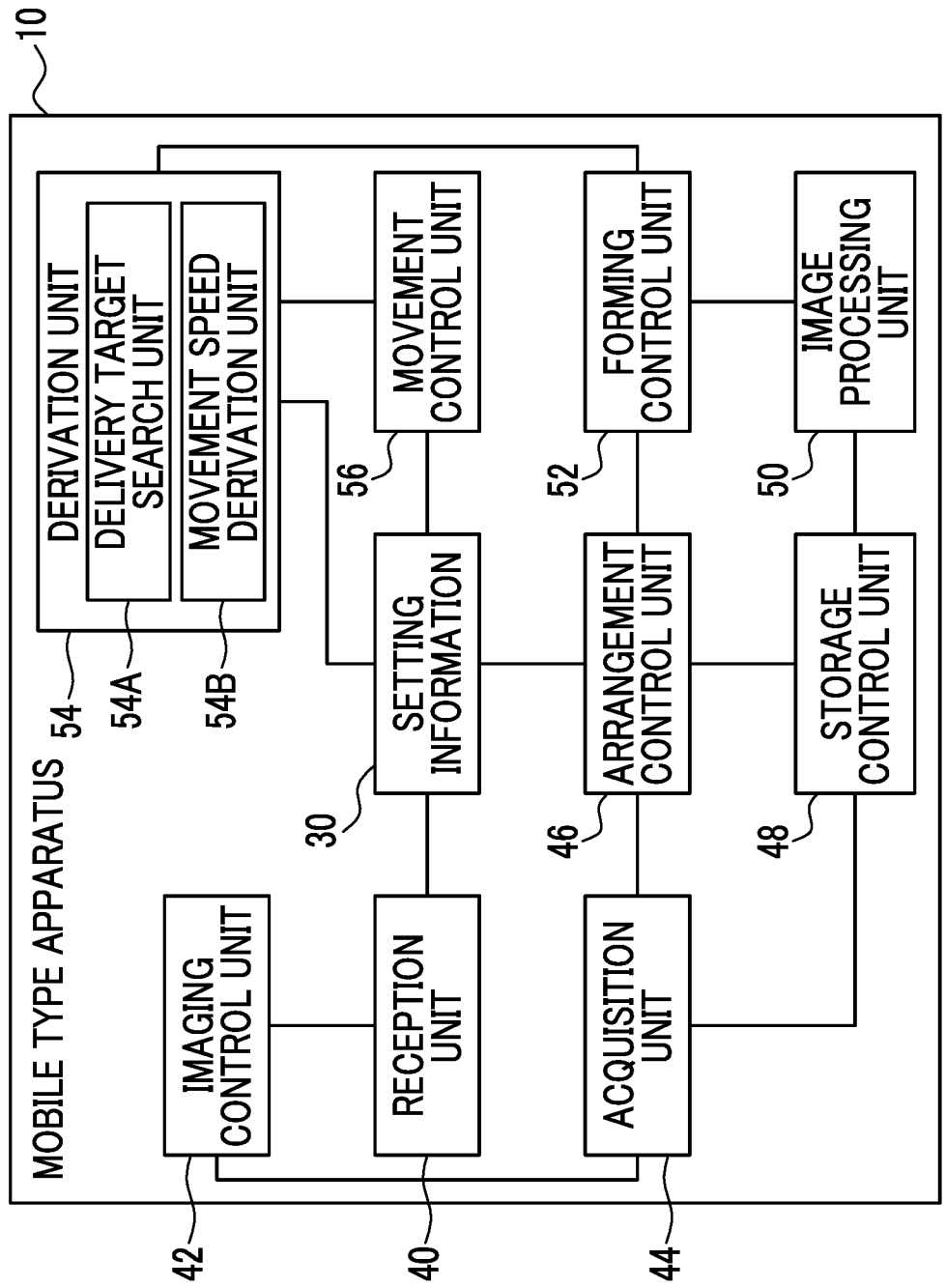
FIG. 3 is a block diagram illustrating one example of a functional configuration of the mobile type apparatus according to the first embodiment.

Next, a functional configuration of the mobile type apparatus 10 according to the present embodiment will be described with reference to FIG. 3. As illustrated in FIG. 3, the mobile type apparatus 10 includes a reception unit 40, an imaging control unit 42, an acquisition unit 44, an arrangement control unit 46, a storage control unit 48, an image processing unit 50, a forming control unit 52, a derivation unit 54, and a movement control unit 56. The derivation unit 54 includes a delivery target search unit 54A and a movement speed derivation unit 54B. The CPU 20 functions as the reception unit 40, the imaging control unit 42, the acquisition unit 44, the arrangement control unit 46, the storage control unit 48, the image processing unit 50, the forming control unit 52, the derivation unit 54, and the movement control unit 56 by executing a program prestored in the storage unit 22.

The reception unit 40 receives, through the communication I/F 25, the setting information 30 input by a terminal such as a smartphone and stores the received setting information 30 in the storage unit 22. The setting information 30 includes imaging target information for specifying the imaging target S. In a case where the imaging target S is a target represented by the common noun described above, examples of the imaging target information include the common noun. In a case where the imaging target S is a target represented by the proper noun described above, examples of the imaging target information include an image of the imaging target S.

The setting information 30 also includes delivery target information for specifying the delivery target U. Examples of the delivery target information include an image of the delivery target U. The setting information 30 also includes a storage condition of the image. For example, examples of the storage condition of the image include a condition that the imaging target S is present in a predetermined size at a predetermined position (for example, a center position) in the image.

The setting information 30 also includes information indicating a movable range (hereinafter, referred to as a "deliverable range") for delivering the photosensitive recording medium to the delivery target U. Examples of the deliverable range include an upper limit value of a distance in which the mobile type apparatus 10 can move in order to deliver the photosensitive recording medium to the delivery target U. The deliverable range may be a range on a map generated using a map generation method such as simultaneous localization and mapping (SLAM).

The setting information 30 also includes information indicating a range (hereinafter, referred to as an acquirable range) of a distance in which the delivery target U can acquire the photosensitive recording medium discharged in the deliverable state by the discharge unit 16. Examples of the acquirable range include the upper limit value of the distance in which the delivery target U can acquire the photosensitive recording medium discharged in the deliverable state by the discharge unit 16.

The imaging control unit 42 controls the imaging apparatus 12 to capture an image. The acquisition unit 44 acquires the image obtained by imaging performed by the imaging apparatus 12. The arrangement control unit 46 performs a control for arranging the imaging target S within an angle of view of the imaging apparatus 12. In the present embodiment, the arrangement control unit 46 performs image analysis processing such as face recognition processing on the image acquired by the acquisition unit 44. By this image analysis processing, the arrangement control unit 46 determines whether or not the imaging target S specified by the imaging target information included in the setting information 30 is present in the image and satisfies the storage condition of the image included in the setting information 30.

In a case where this determination results in a negative determination, the arrangement control unit 46 performs at least one of changing the height and the attitude of the imaging apparatus 12 by controlling the movement mechanism 26, moving the mobile type apparatus 10 by controlling the drive unit 27, or changing a zoom magnification of the imaging apparatus 12. Accordingly, the arrangement control unit 46 performs the control for arranging the imaging target S within the angle of view of the imaging apparatus 12.

In a case where the above determination performed by the arrangement control unit 46 results in a positive determination, the storage control unit 48 performs a control for storing the image acquired by the acquisition unit 44 in the storage unit 22. The image processing unit 50 performs image processing of processing the image stored in the storage unit 22 under control of the storage control unit 48. Examples of the image processing include adjustment of brightness of the image, adjustment of a degree of blurriness of the image, removal of a noise of the image, superimposition of a text on the image, and superimposition of other images such as a character on the image.

In a case where the above determination performed by the arrangement control unit 46 results in a positive determination, the forming control unit 52 controls the image forming apparatus 14 to form, on the photosensitive recording medium, the image subjected to the image processing performed by the image processing unit 50. The delivery target search unit 54A searches for the delivery target U. In the present embodiment, in the same manner as the arrangement control unit 46, the delivery target search unit 54A performs the image analysis processing such as the face recognition processing on the image acquired by the acquisition unit 44. By this image analysis processing, the delivery target search unit 54A determines whether or not the delivery target U specified by the delivery target information included in the setting information 30 is present in the image. In a case where this determination results in a negative determination, the delivery target search unit 54A performs at least one of changing the height and the attitude of the imaging apparatus 12 by controlling the movement mechanism 26, moving the mobile type apparatus 10 by controlling the drive unit 27, or changing the zoom magnification of the imaging apparatus 12. The delivery target search unit 54A searches for the delivery target U by repeating this processing until the delivery target U is present in the image. In a case where the delivery target U possesses a terminal such as a smartphone, the delivery target search unit 54A may search for the delivery target U by performing wireless communication with the terminal.

For the searched delivery target U, the movement speed derivation unit 54B derives a movement speed illustrated below from a distance to the delivery target U measured by the distance measurement unit 28 and a time period required from a start of forming of the image by the forming control unit 52 until completion of discharge performed by the discharge unit 16. That is, in this case, the movement speed derivation unit 54B derives, from the distance and the time period, the movement speed at which the photosensitive recording medium becomes the deliverable state at a position at which the photosensitive recording medium can be delivered to the delivery target U.

Specifically, the movement speed derivation unit 54B derives the movement speed by dividing the distance by the time period in accordance with Expression (1) below. In Expression (1), V denotes the movement speed at which the photosensitive recording medium becomes the deliverable state at the position at which the photosensitive recording medium can be delivered to the delivery target U. In addition, in Expression (1), D denotes the distance to the delivery target U measured by the distance measurement unit 28. In addition, in Expression (1), T denotes the time period required from the start of forming of the image by the forming control unit 52 until completion of discharge performed by the discharge unit 16.

$$V = D \div T \tag{1}$$

The movement speed derived by Expression (1) is one example and is not limited to this example. For example, the movement speed may be preset.

The movement control unit 56 controls movement of the mobile type apparatus 10 for delivering the photosensitive recording medium to the delivery target U by controlling the drive unit 27. Specifically, the movement control unit 56 controls the drive unit 27 such that the mobile type apparatus 10 moves toward the delivery target U at the movement speed derived by the movement speed derivation unit 54B.

The mobile type apparatus 10 according to the present embodiment starts controlling movement by the movement control unit 56 described above and starts forming the image by the forming control unit 52 at the same timing. These two starts may not be performed at the same timing. For example, forming of the image by the forming control unit 52 may be started after controlling of movement by the movement control unit 56 is started. In this case, the forming control unit 52 starts forming the image before movement of the mobile type apparatus 10 into the acquirable range is completed. Alternatively, for example, controlling of movement by the movement control unit 56 may be started after forming of the image by the forming control unit 52 is started. In this case, the movement control unit 56 starts controlling movement before discharge, by the discharge unit 16, of the photosensitive recording medium on which the image is formed is completed. That is, the mobile type apparatus 10 causes at least a partial period to overlap between a period from the start of forming of the image on the photosensitive recording medium by the forming control unit 52 until completion of discharge of the photosensitive recording medium by the discharge unit 16, and a period from the start of movement under control of the movement control unit 56 until completion of the movement.

Figure 4:
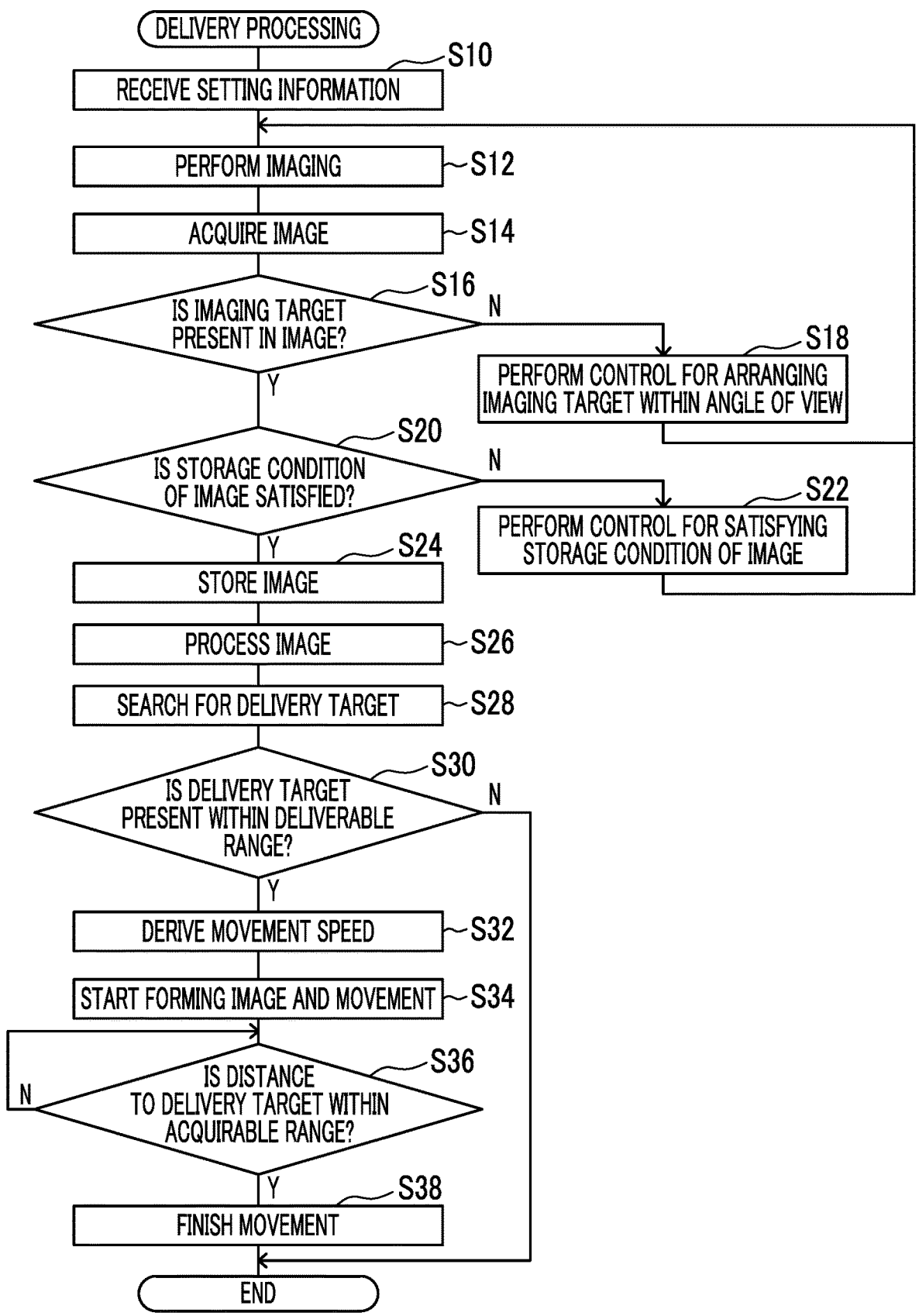
FIG. 4 is a flowchart illustrating one example of delivery processing according to the first embodiment.

Next, an effect of the mobile type apparatus 10 according to the present embodiment will be described with reference to FIG. 4. Delivery processing illustrated in FIG. 4 is executed by causing the CPU 20 to execute a program stored in the storage unit 22. The delivery processing illustrated in FIG. 4 is executed in a case where the mobile type apparatus 10 receives the setting information 30 input by the terminal such as a smartphone.

In step S10 in FIG. 4, the reception unit 40 receives, through the communication I/F 25, the setting information 30 input by the terminal such as a smartphone and stores the received setting information 30 in the storage unit 22. In step S12, the imaging control unit 42 controls the imaging apparatus 12 to capture an image. In step S14, the acquisition unit 44 acquires the image obtained by imaging performed by the imaging apparatus 12 by processing in step S12.

In step S16, as described above, the arrangement control unit 46 determines whether or not the imaging target S specified by the imaging target information included in the setting information 30 received by processing in step S10 is present in the image acquired by processing in step S14. In a case where this determination results in a negative determination, processing transitions to step S18. In a case of a positive determination, processing transitions to step S20.

In step S18, the arrangement control unit 46 performs at least one of changing the height and the attitude of the imaging apparatus 12 by controlling the movement mechanism 26, moving the mobile type apparatus 10 by controlling the drive unit 27, or changing the zoom magnification of the imaging apparatus 12. Accordingly, the arrangement control unit 46 performs the control for arranging the imaging target S within the angle of view of the imaging apparatus 12. In a case where processing in step S18 is finished, processing returns to step S12.

In step S20, as described above, the arrangement control unit 46 determines whether or not the imaging target S specified by the imaging target information included in the setting information 30 received by processing in step S10 satisfies the storage condition of the image included in the setting information 30. In a case where this determination results in a negative determination, processing transitions to step S22. In a case of a positive determination, processing transitions to step S24.

In step S22, the arrangement control unit 46 performs at least one of changing the height and the attitude of the imaging apparatus 12 by controlling the movement mechanism 26, moving the mobile type apparatus 10 by controlling the drive unit 27, or changing the zoom magnification of the imaging apparatus 12. Accordingly, the arrangement control unit 46 performs a control such that the imaging target S satisfies the storage condition of the image. In a case where processing in step S22 is finished, processing returns to step S12.

In step S24, the storage control unit 48 performs the control for storing the image acquired by processing in step S14 in the storage unit 22. In step S26, as described above, the image processing unit 50 performs the image processing of processing the image stored in the storage unit 22 under control of processing in step S24. In step S28, as described above, the delivery target search unit 54A searches for the delivery target U.

In step S30, the delivery target search unit 54A determines whether or not the delivery target U searched by processing in step S28 is present within the deliverable range included in the setting information 30 received by processing in step S10. In a case where this determination results in a negative determination, the delivery processing is finished. In a case of a positive determination, processing transitions to step S32.

In step S32, for the delivery target U searched by processing in step S28, the movement speed derivation unit 54B derives the movement speed in accordance with Expression (1) from the distance to the delivery target U measured by the distance measurement unit 28 and the time period required from the start of forming of the image by the forming control unit 52 until completion of discharge performed by the discharge unit 16.

In step S34, the forming control unit 52 performs a control for forming, on the photosensitive recording medium, the image subjected to the image processing by processing in step S26. At the same timing as this control, the movement control unit 56 controls the drive unit 27 such that the mobile type apparatus 10 moves toward the delivery target U at the movement speed derived by processing in step S32. That is, by these controls, forming of the image by the image forming apparatus 14 and movement of the mobile type apparatus 10 are started at the same timing. Forming of the image by the image forming apparatus 14 is continuously performed until discharge of the photosensitive recording medium by the discharge unit 16 is completed. Movement of the mobile type apparatus 10 is continuously performed until step S38 described later is executed.

In step S36, the movement control unit 56 determines whether or not the distance to the delivery target U measured by the distance measurement unit 28 is within the acquirable range included in the setting information 30 received by processing in step S10. In a case where this determination results in a negative determination, step S36 is executed again at a predetermined time interval. In a case of a positive determination, processing transitions to step S38.

In step S38, the movement control unit 56, by controlling the drive unit 27, finishes movement of the mobile type apparatus 10 started by processing in step S34. In a case where processing in step S38 is finished, the delivery processing is finished. The delivery target U acquires the photosensitive recording medium discharged from the discharge unit 16 of the image forming apparatus 14 of the mobile type apparatus 10 that has moved to a vicinity of the delivery target U. Processing may return to step S12 after finish of step S38. In this case, processing from step S12 to step S38 may be repeatedly executed a plurality of times using the setting information 30 received once.

As described above, according to the present embodiment, the period from the start of forming of the image on the recording medium until completion of discharge of the recording medium by the discharge unit 16 is caused to overlap with the time period from the start of movement under control of the movement control unit 56 until completion of the movement. Accordingly, the recording medium on which the image is formed can be quickly delivered.

Second Embodiment

Figure 5:
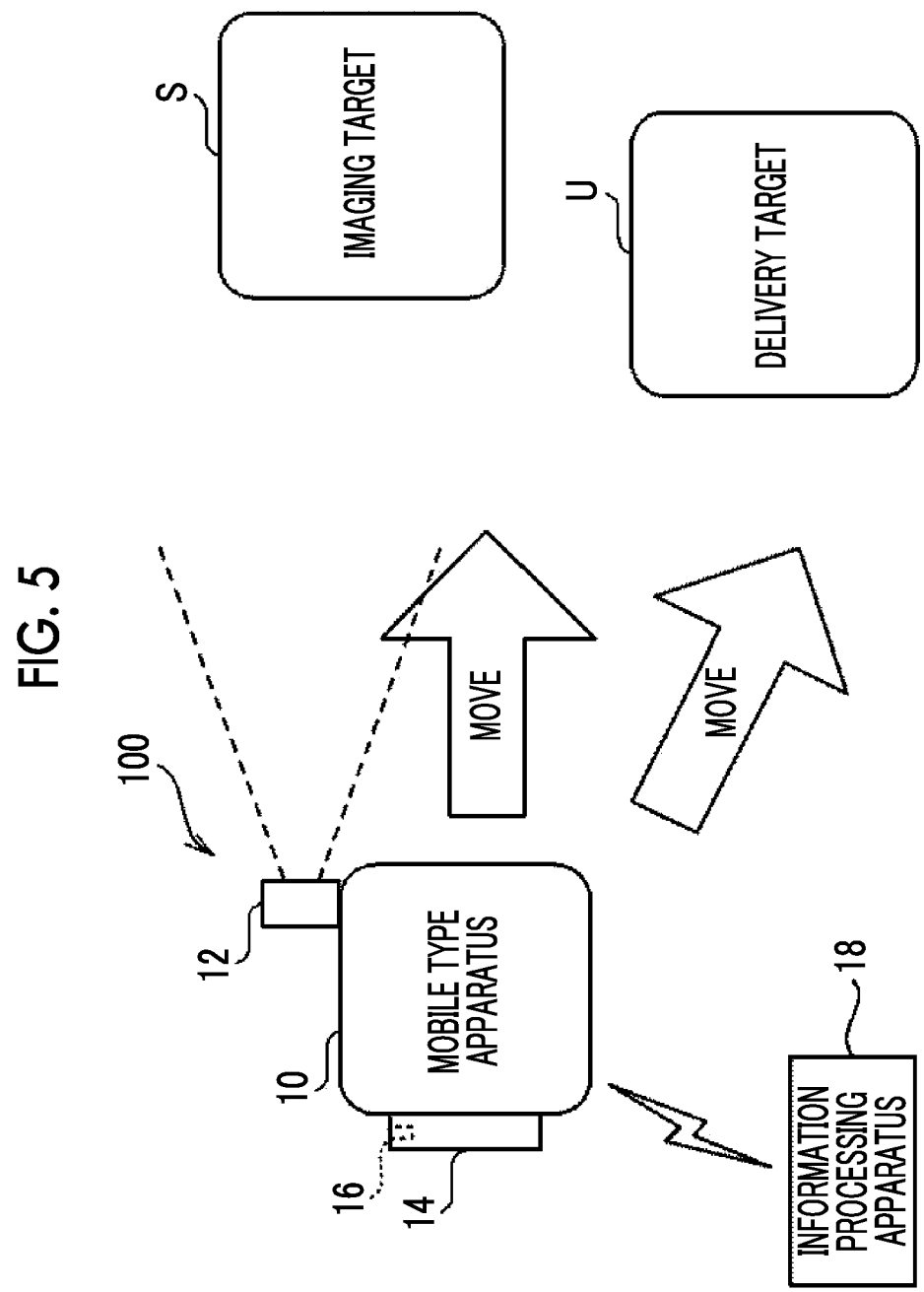
FIG. 5 is a block diagram illustrating one example of a configuration of an imaging system according to the second embodiment.

A second embodiment of the technology of the disclosure will be described. The same constituents as the first embodiment will be designated by the same reference signs and will not be described here. First, a configuration of an imaging system 100 according to the present embodiment will be described with reference to FIG. 5. As illustrated in FIG. 5, the imaging system 100 includes the mobile type apparatus 10 comprising the imaging apparatus 12 and the image forming apparatus 14, and an information processing apparatus 18. The mobile type apparatus 10 and the information processing apparatus 18 are communicably connected to each other by wireless communication. Examples of the information processing apparatus 18 include a personal computer or a server computer. A hardware configuration of the mobile type apparatus 10 is the same as the first embodiment and thus, will not be described here.

Figure 6:
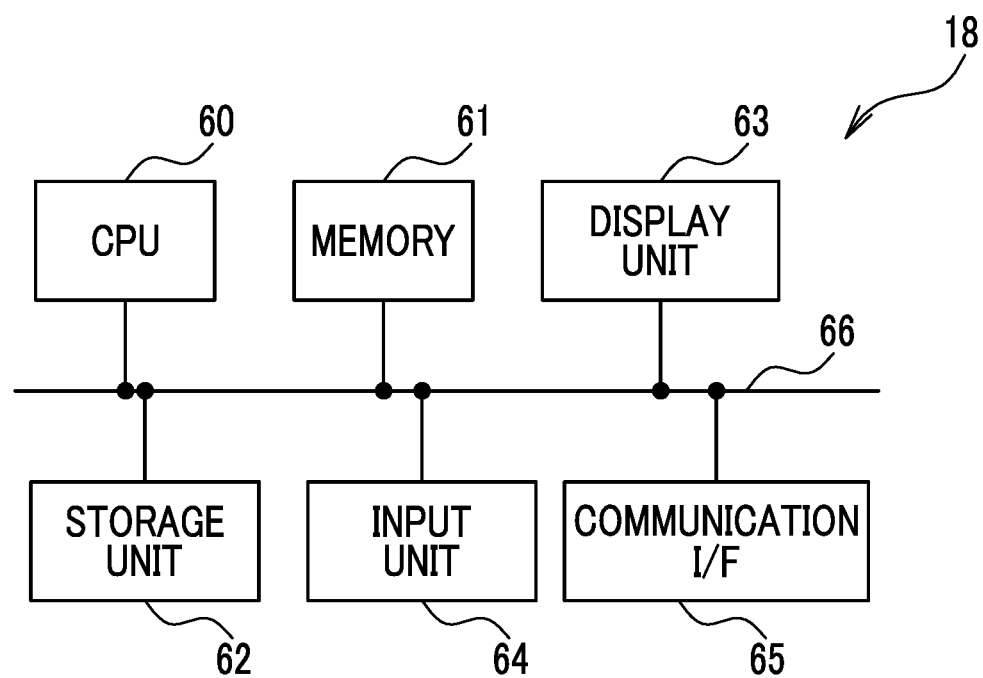
FIG. 6 is a block diagram illustrating one example of a hardware configuration of an information processing apparatus according to the second embodiment.

Next, a hardware configuration of the information processing apparatus 18 will be described with reference to FIG. 6. As illustrated in FIG. 6, the information processing apparatus 18 comprises a CPU 60, a memory 61 as a temporary storage region, and a non-volatile storage unit 62. In addition, the information processing apparatus 18 comprises a display unit 63 such as a liquid crystal display, an input unit 64 such as a mouse and a keyboard, and a communication I/F 65 used for communication with the mobile type apparatus 10. The CPU 60, the memory 61, the storage unit 62, the display unit 63, the input unit 64, and the communication I/F 65 are connected through a bus 66.

Figure 7:
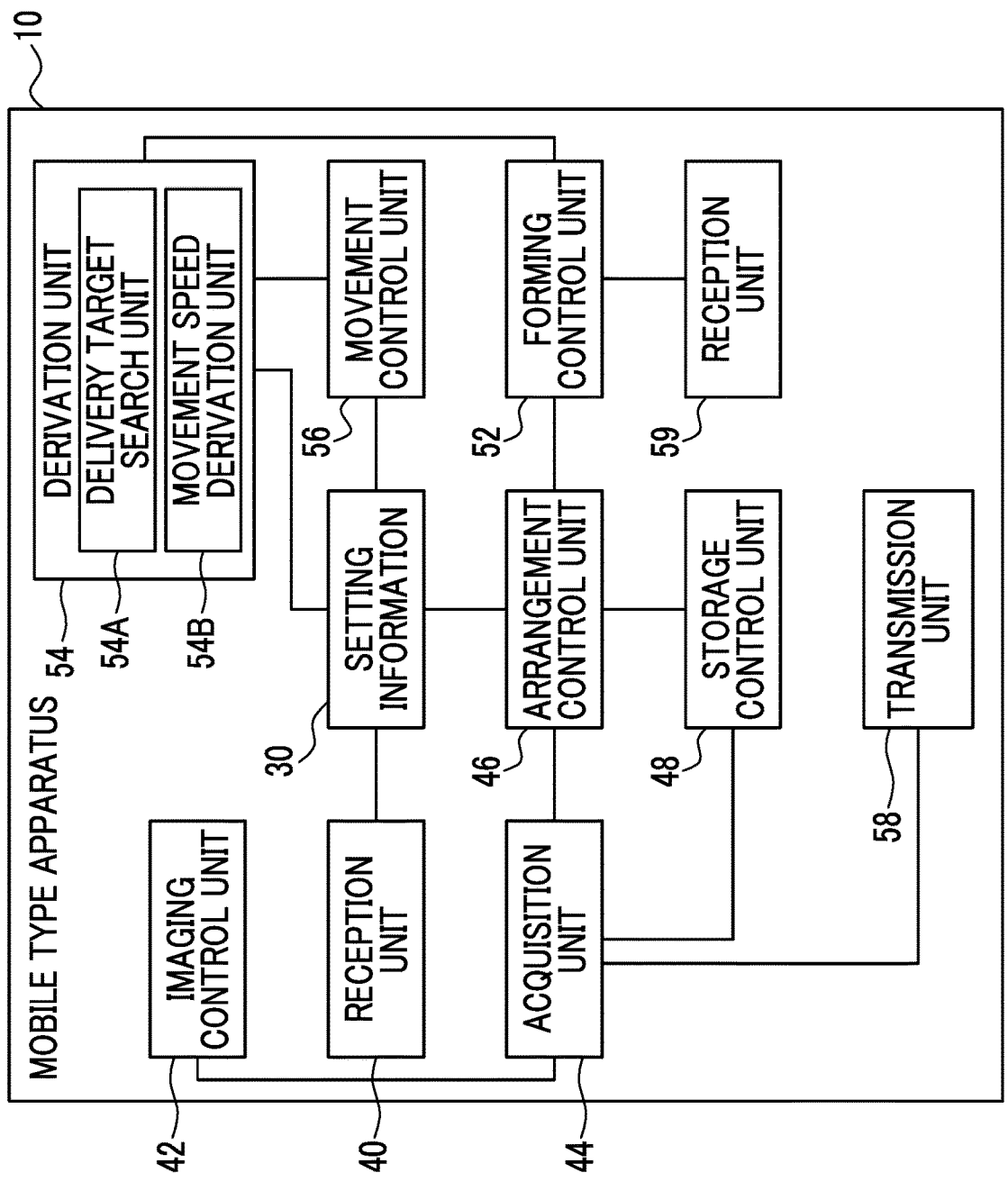
FIG. 7 is a block diagram illustrating one example of a functional configuration of the mobile type apparatus according to the second embodiment.

Next, a functional configuration of the mobile type apparatus 10 according to the present embodiment will be described with reference to FIG. 7. As illustrated in FIG. 7, the mobile type apparatus 10 includes the reception unit 40, the imaging control unit 42, the acquisition unit 44, the arrangement control unit 46, the storage control unit 48, the forming control unit 52, the derivation unit 54, the movement control unit 56, a transmission unit 58, and a reception unit 59. The transmission unit 58 is one example of a first transmission unit, and the reception unit 59 is one example of a second reception unit. The derivation unit 54 includes the delivery target search unit 54A and the movement speed derivation unit 54B. The CPU 20 functions as the reception unit 40, the imaging control unit 42, the acquisition unit 44, the arrangement control unit 46, the storage control unit 48, the forming control unit 52, the derivation unit 54, the movement control unit 56, the transmission unit 58, and the reception unit 59 by executing the program prestored in the storage unit 22.

In a case where the above determination performed by the arrangement control unit 46 results in a positive determination, the transmission unit 58 transmits the image acquired by the acquisition unit 44 to the information processing apparatus 18 through the communication I/F 25. The reception unit 59 receives, through the communication I/F 25, an image transmitted from the information processing apparatus 18.

Figure 8:
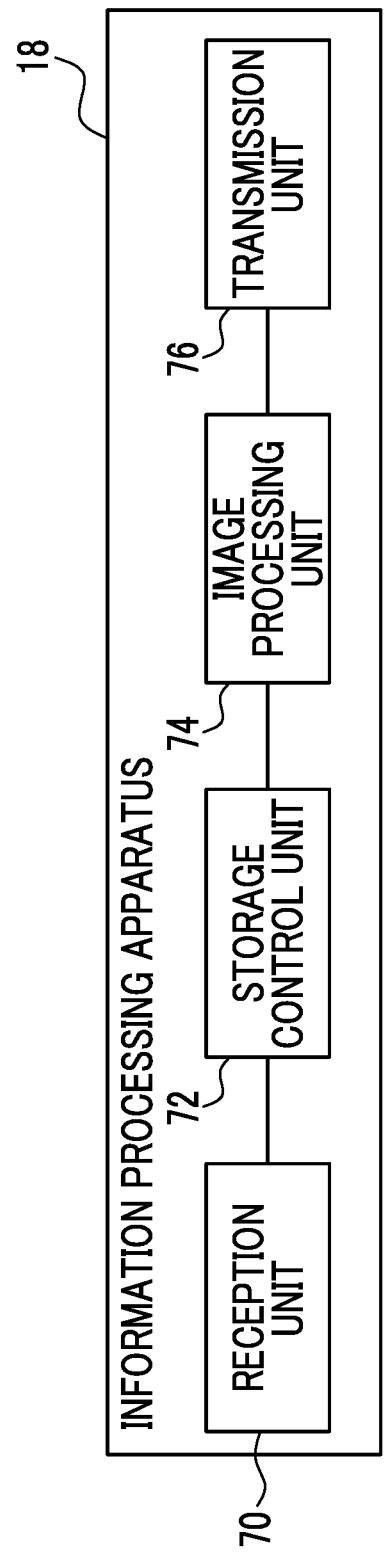
FIG. 8 is a block diagram illustrating one example of a functional configuration of the information processing apparatus according to the second embodiment.

Next, a functional configuration of the information processing apparatus 18 according to the present embodiment will be described with reference to FIG. 8. As illustrated in FIG. 8, the information processing apparatus 18 includes a reception unit 70, a storage control unit 72, an image processing unit 74, and a transmission unit 76. The reception unit 70 is one example of a first reception unit, and the transmission unit 76 is one example of a second transmission unit. The CPU 60 functions as the reception unit 70, the storage control unit 72, the image processing unit 74, and the transmission unit 76 by executing a program prestored in the storage unit 62.

The reception unit 70 receives, through the communication I/F 65, the image transmitted from the mobile type apparatus 10. The storage control unit 72 performs a control for storing the image received by the reception unit 70 in the storage unit 62. In the same manner as the image processing unit 50 according to the first embodiment, the image processing unit 74 performs image processing of processing the image stored in the storage unit 62 under control of the storage control unit 72. The transmission unit 76 transmits the image subjected to the image processing by the image processing unit 74 to the mobile type apparatus 10 through the communication I/F 65.

Figure 9:
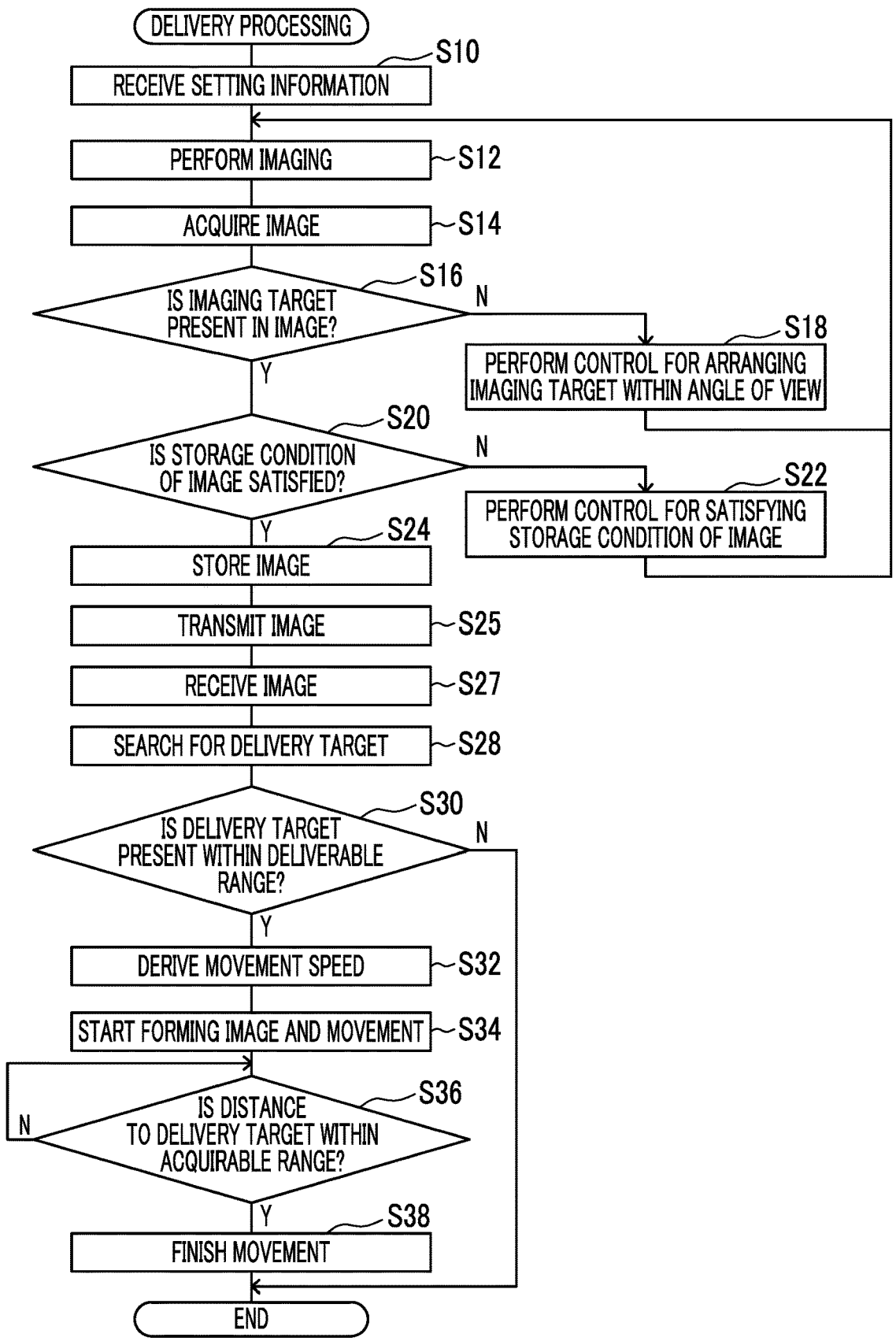
FIG. 9 is a flowchart illustrating one example of delivery processing according to the second embodiment.

Next, an effect of the imaging system 100 according to the present embodiment will be described with reference to FIG. 9 and FIG. 10. Delivery processing illustrated in FIG. 9 is executed by causing the CPU 20 to execute the program stored in the storage unit 22. The delivery processing illustrated in FIG. 9 is executed in a case where the mobile type apparatus 10 receives the setting information 30 input by the terminal such as a smartphone. In FIG. 9, steps executing the same processing as FIG. 4 will be designated by the same reference signs and will not be described here.

Figure 10:
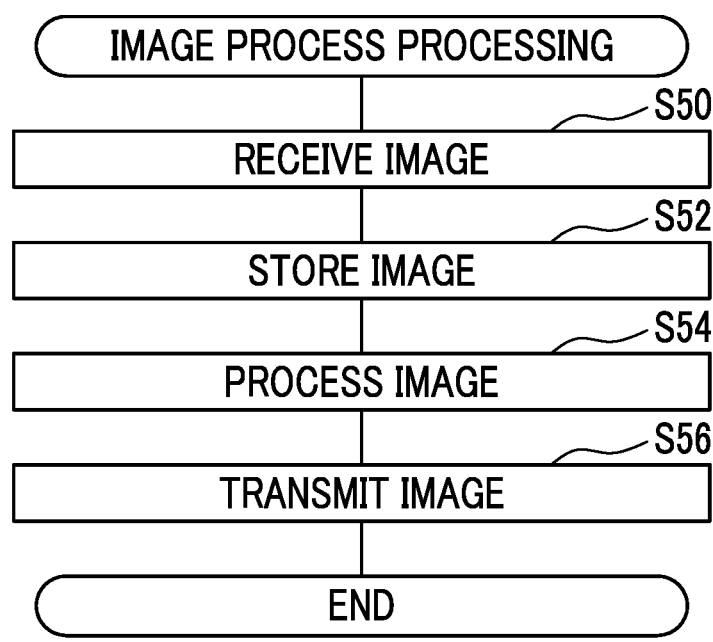
FIG. 10 is a flowchart illustrating one example of image process processing according to the second embodiment.

Image process processing illustrated in FIG. 10 is executed by causing the CPU 60 to execute the program stored in the storage unit 62. For example, the image process processing illustrated in FIG. 10 is executed in a case where the information processing apparatus 18 receives the image transmitted from the mobile type apparatus 10.

In step S25 in FIG. 9, the transmission unit 58 transmits the image acquired by processing in step S14 to the information processing apparatus 18 through the communication I/F 25. In step S27, the reception unit 59 receives, through the communication I/F 25, the image transmitted from the information processing apparatus 18 by processing in step S56 of the image process processing described later. In step S34, a control for forming the image received by processing in step S27 on the photosensitive recording medium is performed. Even in the present embodiment, processing may return to step S12 after finish of step S38. In this case, processing from step S12 to step S38 may be repeatedly executed a plurality of times using the setting information 30 received once.

In step S50 in FIG. 10, the reception unit 70 receives, through the communication I/F 65, the image transmitted from the mobile type apparatus 10 by processing in step S25 of the delivery processing. In step S52, the storage control unit 72 performs the control for storing the image received by processing in step S50 in the storage unit 62.

In step S54, the image processing unit 74 performs the image processing of processing the image stored in the storage unit 62 by processing in step S52. In step S56, the transmission unit 76 transmits the image subjected to the image processing by processing in step S54 to the mobile type apparatus 10 through the communication I/F 65. In a case where processing in step S56 is finished, the image process processing is finished.

As described above, according to the present embodiment, the same effect as the first embodiment can be accomplished. In addition, a service such as creating a photo album using the image stored in the information processing apparatus 18 can be further provided.

In each of the embodiments, in a case where the determination performed by the arrangement control unit 46 results in a positive determination, the acquisition unit 44 may acquire a plurality of images consecutively captured by the imaging apparatus 12. In this case, a form in which the forming control unit 52 controls the image forming apparatus 14 to form at least one of the plurality of images acquired by the acquisition unit 44 on the photosensitive recording medium is illustrated. Furthermore, in this case, a form in which the forming control unit 52 performs a control for selecting an image satisfying a preset selection condition, such as an image having the smallest blurriness amount, the brightest image, and an image in which the imaging target S opens eyes, from the plurality of images and forming the selected image on the photosensitive recording medium is illustrated.

While a case where a condition that the imaging target S is present in a predetermined size at a predetermined position in the image is applied as the storage condition of the image is described in each of the embodiments, the disclosure is not limited thereto. For example, a condition that a predetermined gesture (for example, a peace sign) is performed by the imaging target S may be applied as the storage condition of the image. Alternatively, for example, a condition that a predetermined sound is input into the mobile type apparatus 10 may be applied as the storage condition of the image.

Various types of processing executed by causing the CPU to execute software (program) in each of the embodiments may be executed by various processors other than the CPU. In this case, a programmable logic device (PLD) such as a field-programmable gate array (FPGA) that has a circuit configuration changeable after manufacturing, a dedicated electric circuit such as an application specific integrated circuit (ASIC) that is a processor having a circuit configuration dedicatedly designed to execute a specific type of processing, and the like are illustrated as the processors. The various types of processing may be executed by one of the various processors or may be executed by a combination of two or more processors of the same type or different types (for example, a plurality of FPGAs and a combination of the CPU and the FPGA). A hardware structure of the various processors is specifically an electric circuit in which circuit elements such as semiconductor elements are combined.

While an aspect in which the program is prestored (installed) in the storage units 22 and 62 is described in each of the embodiments, the disclosure is not limited thereto. The program may be provided in a form of a recording on a non-transitory recording medium such as a compact disk read only memory (CD-ROM), a digital versatile disk read only memory (DVD-ROM), and a universal serial bus (USB) memory. Alternatively, a form in which the program is downloaded from an external apparatus through a network may be available.

An object of the present disclosure is to quickly deliver a recording medium on which an image is formed.

An aspect of the present disclosure is a mobile type apparatus that includes: a memory; and a processor being connected to the memory and being configured to: acquire an image obtained by imaging performed by an imaging apparatus; perform a control for arranging a preset imaging target within an angle of view of the imaging apparatus; perform a control for forming the image on a recording medium in a case where the imaging target is present in the acquired image; discharge the recording medium on which the image is formed, to a preset delivery target in a deliverable state; control movement of the mobile type apparatus for delivering the recording medium to the delivery target; and derive, from a distance to the delivery target and a time period required from a start of forming of the image until completion of discharge, a movement speed at which the recording medium becomes the deliverable state at a position at which the recording medium is deliverable to the delivery target, wherein at least a partial period overlaps between a period from a start of forming of the image on the recording medium until completion of discharge of the recording medium, and a period from a start of movement until completion of the movement, and wherein the movement is controlled in accordance with the derived movement speed.

Accordingly, the recording medium on which the image is formed can be quickly delivered.

Accordingly, the recording medium can become the deliverable state at the position at which the recording medium on which the image is formed is delivered to the delivery target.

In the mobile type apparatus according to the aspect of the present disclosure, controlling the movement and forming the image may be started at the same timing.

Accordingly, the recording medium on which the image is formed can be more quickly delivered.

In the mobile type apparatus according to the aspect of the present disclosure, the recording medium may be a photosensitive recording medium.

Accordingly, the image can be quickly formed.

In the mobile type apparatus according to the aspect of the present disclosure, in a case where the imaging target is present in the acquired image, a control for forming at least one of a plurality of images consecutively captured by the imaging apparatus on the recording medium may be performed.

Accordingly, an appropriate image can be formed on the recording medium from the plurality of images.

The mobile type apparatus according to the aspect of the present disclosure may perform a control for storing the image in a non-volatile storage unit in a case where the imaging target is present in the acquired image, in which a control for forming the image stored in the storage unit on the recording medium is performed.

Accordingly, an image in which the imaging target is present in the image can be stored.

The mobile type apparatus according to the aspect of the present disclosure may further perform image processing of processing the acquired image.

Accordingly, image processing desired by a user can be executed.

In the mobile type apparatus according to the aspect of the present disclosure, in a case where the imaging target is present in the acquired image and a predetermined gesture is performed by the imaging target, a control for forming the image on the recording medium may be performed.

Accordingly, the captured image can be formed at an appropriate timing.

In the mobile type apparatus according to the aspect of the present disclosure, in a case where the imaging target is present in the acquired image and a predetermined sound is input, a control for forming the image on the recording medium may be performed.

Accordingly, the captured image can be formed at an appropriate timing.

In the mobile type apparatus according to the aspect of the present disclosure, the movement in a case where the delivery target is present within a range predetermined as a deliverable range may be controlled.

Accordingly, the recording medium on which the image is recorded can be securely delivered.

An imaging system according to another aspect of the present disclosure includes the mobile type apparatus according to the aspect of the present disclosure, and an information processing apparatus that receives an image transmitted from the mobile type apparatus, in which the mobile type apparatus that transmits the image to the information processing apparatus in a case where the imaging target is present in the acquired image.

Accordingly, the image can be stored in the information processing apparatus.

In the imaging system according to the aspect of the present disclosure, the information processing apparatus may further transmit the received image to the mobile type apparatus, and the mobile type apparatus may further receive the image transmitted from the information processing apparatus.

Accordingly, the image can be formed through the information processing apparatus.

In the imaging system according to the aspect of the present disclosure, the information processing apparatus may further perform image processing of processing the received image.

Accordingly, the image can be processed by the information processing apparatus.

According to the present disclosure, the recording medium on which the image is formed can be quickly delivered.

What is claimed is:

1. A mobile type apparatus comprising:
a memory; and
a processor being connected to the memory and being configured to:
acquire an image obtained by imaging performed by an imaging apparatus;
perform a control for arranging a preset imaging target within an angle of view of the imaging apparatus;

perform a control for forming the image on a recording medium in a case where the imaging target is present in the acquired image;

discharge the recording medium on which the image is formed, to a preset delivery target in a deliverable state;

control movement of the mobile type apparatus for delivering the recording medium to the delivery target; and derive, from a distance to the delivery target and a time period required from a start of forming of the image until completion of discharge, a movement speed at which the recording medium becomes the deliverable state at a position at which the recording medium is deliverable to the delivery target, wherein at least a partial period overlaps between a period from a start of forming of the image on the recording medium until completion of discharge of the recording medium, and a period from a start of movement until completion of the movement, and wherein the movement is controlled in accordance with the derived movement speed.

2. The mobile type apparatus according to claim 1, wherein controlling the movement and forming the image are started at the same timing.

3. The mobile type apparatus according to claim 1, wherein the recording medium is a photosensitive recording medium.

4. The mobile type apparatus according to claim 1, wherein in a case where the imaging target is present in the acquired image, a control for forming at least one of a plurality of images consecutively captured by the imaging apparatus on the recording medium is performed.

5. The mobile type apparatus according to claim 1, wherein:
a control for storing the image in a non-volatile storage unit is performed in a case where the imaging target is present in the acquired image, and
a control for forming the image stored in the storage unit on the recording medium is performed.

6. The mobile type apparatus according to claim 1, wherein image processing of processing the acquired image.

7. The mobile type apparatus according to claim 1, wherein in a case where the imaging target is present in the acquired image and a predetermined gesture is performed by the imaging target, a control for forming the image on the recording medium is performed.

8. The mobile type apparatus according to claim 1, wherein in a case where the imaging target is present in the acquired image and a predetermined sound is input, a control for forming the image on the recording medium is performed.

9. The mobile type apparatus according to claim 1, wherein the movement is controlled in a case where the delivery target is present within a range predetermined as a deliverable range.

10. An imaging system comprising:
a mobile type apparatus; and
an information processing apparatus, wherein:
the mobile type apparatus includes:
 a first memory; and
 a first processor being connected to the first memory and being configured to:
  acquire an image obtained by imaging performed by an imaging apparatus;
  perform a control for arranging a preset imaging target within an angle of view of the imaging apparatus;
  perform a control for forming the image on a recording medium in a case where the imaging target is present in the acquired image;
  discharge the recording medium on which the image is formed, to a preset delivery target in a deliverable state;
  control movement of the mobile type apparatus for delivering the recording medium to the delivery target; and
  derive, from a distance to the delivery target and a time period required from a start of forming of the image until completion of discharge, a movement speed at which the recording medium becomes the deliverable state at a position at which the recording medium is deliverable to the delivery target,
  wherein at least a partial period overlaps between a period from a start of forming of the image on the recording medium until completion of discharge of the recording medium, and a period from a start of movement until completion of the movement, and
  wherein the movement is controlled in accordance with the derived movement speed, the information processing apparatus includes:
 a second memory; and
 a second processor being connected to the second memory and being configured to:
  receive an image transmitted from the mobile type apparatus,
  wherein the first processor is further configured to transmit the image to the information processing apparatus in a case where the imaging target is present in the acquired image.

11. The imaging system according to claim 10, wherein the second processor is further configured to transmit the received image to the mobile type apparatus, and
the first processor is further configured to receive the image transmitted from the information processing apparatus.

12. The imaging system according to claim 10, wherein the second processor is further configured to perform image processing of processing the received image.

* * * * *